(12) United States Patent
Swoish et al.

(10) Patent No.: US 9,140,156 B2
(45) Date of Patent: Sep. 22, 2015

(54) NOX-FLOWRATE AND TEMPERATURE CORRECTION DURING SOOT MASS ESTIMATION IN A VEHICLE EXHAUST AFTER-TREATMENT DEVICE

(75) Inventors: Christopher C. Swoish, Lapeer, MI (US); Douglas Christopher Sarsen, Howell, MI (US); Christopher Whitt, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 283 days.

(21) Appl. No.: 13/563,827

(22) Filed: Aug. 1, 2012

(65) Prior Publication Data

US 2014/0033678 A1    Feb. 6, 2014

(51) Int. Cl.
*F01N 3/00* (2006.01)
*F01N 3/023* (2006.01)
*F01N 11/00* (2006.01)
*F01N 9/00* (2006.01)

(52) U.S. Cl.
CPC ............. *F01N 3/023* (2013.01); *F01N 9/002* (2013.01); *F01N 11/00* (2013.01); *F01N 2900/0601* (2013.01); *F01N 2900/1606* (2013.01); *Y02T 10/47* (2013.01)

(58) Field of Classification Search
CPC .......... F01N 11/00; F01N 3/023; F01N 3/00; F01N 11/002; F01N 9/002; F02D 41/029
USPC .................................................. 60/272–324
See application file for complete search history.

(56) References Cited

U.S. PATENT DOCUMENTS

| | | | |
|---|---|---|---|
| 2003/0167757 A1 | 9/2003 | Boretto et al. | |
| 2005/0137776 A1 | 6/2005 | Gioannini et al. | |
| 2007/0056272 A1* | 3/2007 | Dollmeyer et al. | 60/297 |
| 2011/0209460 A1* | 9/2011 | He et al. | 60/274 |
| 2012/0000184 A1* | 1/2012 | Ardanese et al. | 60/274 |
| 2012/0124973 A1* | 5/2012 | Lee et al. | 60/287 |
| 2013/0125529 A1* | 5/2013 | Ardanese et al. | 60/274 |
| 2013/0291520 A1* | 11/2013 | Schiavone et al. | 60/274 |

FOREIGN PATENT DOCUMENTS

| | | | |
|---|---|---|---|
| EP | 1333165 A1 | 8/2003 | |
| EP | 1541829 A1 | 6/2005 | |

\* cited by examiner

*Primary Examiner* — Thomas Denion
*Assistant Examiner* — Kelsey Stanek
(74) *Attorney, Agent, or Firm* — Quinn Law Group, PLLC

(57) ABSTRACT

A method of correcting a soot mass estimate in a vehicle exhaust after-treatment device includes monitoring an exhaust gas pressure drop across a particulate filter included with the vehicle exhaust after-treatment device; determining an initial soot mass estimate from a monitored exhaust gas pressure drop; revising the initial soot mass estimate in view of a monitored engine speed, engine load, exhaust gas temperature, and NOx gas flow rate; and generating a particulate filter regeneration request if the revised soot mass estimate exceeds a threshold.

10 Claims, 1 Drawing Sheet

NOX-FLOWRATE AND TEMPERATURE CORRECTION DURING SOOT MASS ESTIMATION IN A VEHICLE EXHAUST AFTER-TREATMENT DEVICE

TECHNICAL FIELD

The present invention relates to a method of monitoring a particulate filter in an exhaust gas after-treatment system using a differential pressure module.

BACKGROUND

Various exhaust after-treatment devices, such as particulate filters and other devices, have been developed to effectively limit exhaust emissions from internal combustion engines. In the case of compression-ignition or diesel engines, a great deal of effort continues to be expended to develop practical and efficient devices and methods to reduce emissions of largely carbonaceous particulates otherwise present in the engine's exhaust gas.

An after-treatment system for a modern diesel engine exhaust typically incorporates a diesel particulate filter (DPF) for collecting and disposing of the sooty particulate matter emitted by the diesel engine prior to the exhaust gas being discharged to the atmosphere. A typical DPF acts as a trap for removing the particulate matter from the exhaust stream. The DPF may also contain precious metals, such as platinum and/or palladium, which serve as catalysts to passively oxidize soot and hydrocarbons present in the exhaust stream. In many instances, the DPF may be regenerated or cleaned using superheated exhaust gas to burn off the collected particulate.

The particulate matter included in the engine exhaust gasses may include carbonaceous soot particulates that may be oxidized to produce gaseous carbon dioxide, as well as other non-combustible particulates (i.e., ash) that are not capable of being oxidized. The composition and morphology of exhaust gasses is largely a function of the fuel, engine type, engine design, engine operation and control methodology, environmental operating conditions and other factors. For example, engine lubricating oil that passes into the combustion chamber and is partially burned produces the majority of ash. As a further example, combustion in gasoline engines may produce submicron organic matter (OM), as well as sulfates and elemental silicon, iron, or zinc or sulfur. The elemental silicon, iron and zinc are non-combustible particulates and may comprise ash. As another example, combustion in diesel engines may also produce OM, sulfates and elemental silicon, iron, zinc or sulfur, as well as soot and ammonium.

While the pressure drop across the particulate filter may ordinarily be a good proxy for trapped soot mass concentration, in certain temperature ranges and at certain nitrogen dioxide levels in the exhaust flow, the pressure drop may become a less accurate predictor. These inaccuracies may be due to, for example, passive and nonhomogeneous burning of soot in the filter that may change the soot distribution in the filter (i.e., reducing the correlation between pressure drop over the filter and soot mass in the filter). For example, non-homogeneous burning may cause cracks in the soot layer, reducing the resistance to flow. Such soot estimation inaccuracies may either result in a decrease in the filtering efficiency of the particulate filter, or may cause the filter to be actively regenerated at lower soot concentrations, which may decrease fuel efficiency.

SUMMARY

A method of correcting a soot mass estimate in a vehicle exhaust after-treatment device begins by monitoring an exhaust gas pressure drop across a particulate filter included with the vehicle exhaust after-treatment device, and determining an initial soot mass estimate from a monitored exhaust gas pressure drop. The initial soot mass estimate may then be revised in view of a monitored engine speed, engine load, exhaust gas temperature, and NOx gas flow rate; and a particulate filter regeneration request may be generated if the revised soot mass estimate exceeds a soot threshold.

Revising the initial soot mass estimate in view of a monitored engine speed, engine load, exhaust gas temperature, and NOx gas flow rate may include monitoring an engine speed and an engine load from an engine in fluid communication with the vehicle exhaust after-treatment device; and determining an engine load correction factor from the monitored engine speed and engine load. Additionally, both a temperature and a NOx flow rate of an exhaust gas within the vehicle exhaust after-treatment device may be monitored, from which a NOx correction factor may be determined. Once the engine load correction factor and NOx correction factor are determined, a revised soot mass estimate may be calculated by multiplying the initial soot mass estimate by the engine load correction factor and the NOx correction factor.

In one configuration, determining an engine load correction factor may include selecting an engine load correction factor from a look-up table, wherein the look-up table is a two-dimensional look-up table expressing the engine load correction factor as a function of the engine speed and the engine load. Similarly, determining a NOx correction factor may include selecting a NOx correction factor from a look-up table, wherein the look-up table is a two-dimensional look-up table expressing the NOx correction factor as a function of the exhaust gas temperature and the NOx flow rate of the exhaust gas.

Monitoring the exhaust gas pressure drop across a particulate filter may include: obtaining a first pressure signal from a first fluid tube disposed in fluid communication with the exhaust after-treatment device and between the particulate filter and an engine; obtaining a second pressure signal from a second fluid tube disposed in fluid communication with the exhaust after-treatment device and on an opposite side of the particulate filter from the first fluid tube; and determining a difference between the first pressure signal and the second pressure signal.

In a similar manner, a system for monitoring a particulate filter of an exhaust after-treatment device in fluid communication with an engine of a vehicle, the system may include a first fluid tube disposed in fluid communication with the exhaust after-treatment device and between the particulate filter and the engine, and a second fluid tube disposed in fluid communication with the exhaust after-treatment device and on an opposite side of the particulate filter from the first fluid tube. A differential pressure module is in communication with the first fluid tube and the second fluid tube and configured to generate a delta pressure signal corresponding to a pressure drop between the first fluid tube and the second fluid tube. Finally, a controller is in communication with the differential pressure module and configured to: receive the delta pressure signal from the differential pressure module, and determine an initial soot mass estimate from the delta pressure signal.

The controller is further configured to: monitor an engine speed and an engine load of the engine; determine an engine load correction factor from the monitored engine speed and engine load; monitor a temperature of an exhaust gas within the vehicle exhaust after-treatment device; monitor a NOx flow rate of the exhaust gas; determine a NOx correction factor from the monitored exhaust gas temperature and monitored NOx flow rate of the exhaust gas; calculate a revised soot mass estimate by multiplying the initial soot mass estimate by the engine load correction factor and the NOx correction factor; and generate a particulate filter regeneration request if the revised soot mass estimate exceeds a threshold.

The above features and advantages and other features and advantages of the present invention are readily apparent from the following detailed description of the best modes for carrying out the invention when taken in connection with the accompanying drawings.

DETAILED DESCRIPTION

Figure 1:
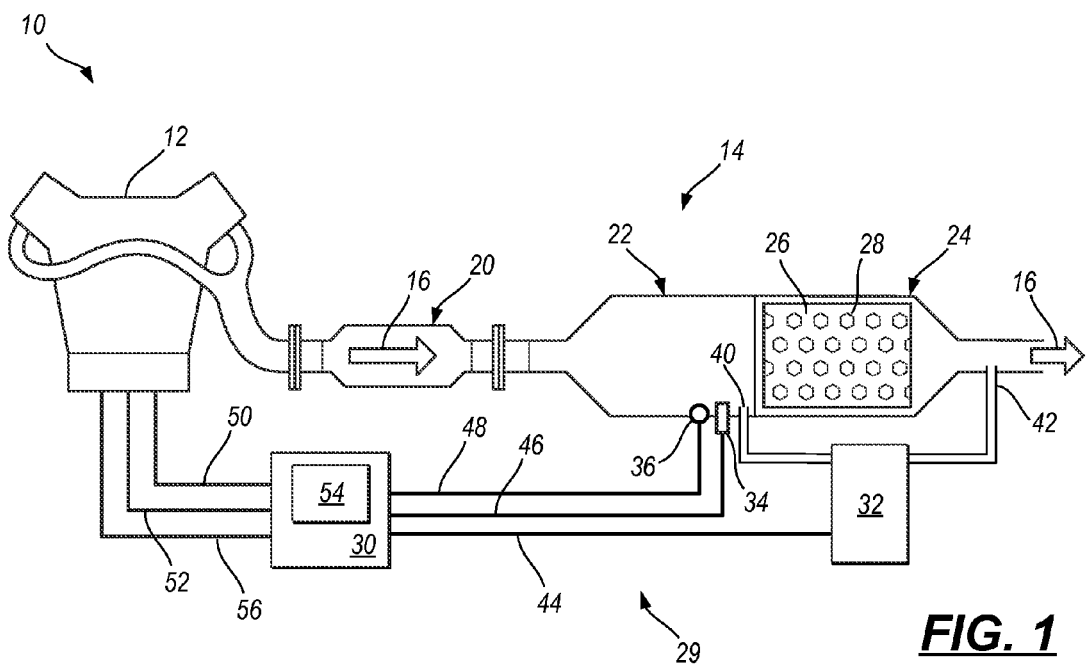
FIG. 1 is a schematic diagram of an engine and an exhaust gas after-treatment system for treating exhaust gas from the engine.

Referring to the drawings, wherein like reference numerals are used to identify like or identical components in the various views, FIG. 1 schematically illustrates a vehicle 10, including an engine 12 and an exhaust gas after-treatment system 14. As may be appreciated, the engine 12 may combust a mixture of fuel and air to provide a motive force for the vehicle 10. The exhaust gas after-treatment system 14 may then direct and treat the byproducts of the combustion (i.e., exhaust gasses) as they flow from the engine 12 (indicated by flow arrows 16). In general, the exhaust gas after-treatment system 14 may remove suspended particulate matter and NOx gasses from the exhaust flow 16 prior to the gas being expelled from the vehicle 10. In one configuration, the engine 12 may be a compression-ignited diesel engine; however, other types of engine technology may similarly be used.

The exhaust gas after-treatment system 14 may generally include a diesel oxidation catalyst ("DOC") 20, a selective calalytic reduction ("SCR") catalyst 22, and a particulate filter 24. The DOC 20 may passively oxidize and/or burn hydrocarbons in the exhaust flow 16, as they exit the engine 12. The SCR catalyst 22 may include an chemical agent that is selectively introduced into the exhaust flow 16 to convert at least some of the nitrogen oxides in the exhaust flow 16 into water and nitrogen.

Finally, the particulate filter 24 may be configured to filter particulate matter, i.e., soot, from the exhaust gas of the engine 12. The particulate filter 24 may include one or more substrates 26 that define a plurality of apertures 28, through which the exhaust gas must flow. As the exhaust gas passes through the particulate filter 24, suspended airborne particulate matter may collect on the substrate 26, where it may be separated from the flow 16.

Over the life of the vehicle 10, the particulate filter 24 may occasionally need to be regenerated to remove any collected particulate matter. In one configuration, the particulate filter 24 may be regenerated by heating the particulate filter 24 to a temperature sufficient to burn the particulate matter off of the substrate 26. In one configuration, the high temperature may be provided by adjusting the air/fuel ratio provided to the engine 12 to be slightly richened, which may then be maintained for a period of time sufficient to burn off a majority of the particulate matter from the substrate 26. In general, the process of "burning off" the particulate matter may involve converting the sooty trapped particulate matter into carbon dioxide, which may be more permissibly dissipated into the atmosphere.

A monitoring system 29 may be employed to monitor various real-time operating parameters of the exhaust flow 16 and estimate the amount of soot contained within the particulate filter 24. If the estimate exceeds a predetermined threshold, the monitoring system may request a regeneration from the engine (or an associated engine controller) to burn off the collected soot within the filter 24. The monitoring system 29 may include a controller 30 configured to determine a flow impedance of the particulate filter 24 by monitoring a differential pressure sensor module 32 disposed across the particulate filter 24. Additionally, the controller 30 may be configured to monitor one or more nitrogen oxide sensors 34, and/or one or more temperature sensors 36 that may be in fluid communication with the exhaust flow 16.

The differential pressure sensor module 32 may monitor a pressure drop across the substrate 26 using a first fluid tube 40 in fluid communication with the after-treatment system 14 at a location upstream of the filter 24 (i.e., between the filter 24 and the engine 12) and a second fluid tube 42 in fluid communication with the after-treatment system 14 at a location downstream of the filter 24 (i.e., on an opposite side of the particulate filter 24 from the first fluid tube 40). The differential pressure module 32 may detect a pressure drop between the respective first and second fluid tubes 40, 42, and may provide a signal 44 (i.e., the delta pressure signal 44) to the controller 30 that is indicative of the magnitude of the difference. In another configuration, one or more electronic pressure sensors may be used to determine the pressure drop across the particulate filter 24. An electronic pressure sensor may include a piezoresistive sensor, a piezoelectric sensor, a MEMS sensor, and/or a capacitive sensor configured to convert a sensed pressure into an analog or digital signal representative of the sensed pressure.

The nitrogen oxide sensor 34 may be configured to measure the mass flow rate of nitrogen oxides present in the exhaust flow 16. It may then provide a NOx signal 46 to the controller 30 that corresponds to this measured quantity. A temperature sensor 36 may be disposed upstream of the particulate filter 24, and may be configured to measure the temperature of the exhaust flow 16 entering the filter 24. The temperature sensor may provide a temperature signal 48 to the controller 30 corresponding to this monitored value. As illustrated, the temperature sensor 36 may be disposed between the SCR 22 and the particulate filter 24 to measure the temperature of the gasses entering the filter 24. A second temperature sensor (not shown) may be disposed downstream of the filter 24, and may similarly be used to measure the temperature of the exhaust flow 16 following filtration.

In general, the controller 30 may use the sensed pressure drop 44, NOx flowrate 46, monitored temperature 48, engine speed 50, and engine load 52 as inputs into a soot model 54 that may estimate the status/capacity of the particulate filter 24. As will be described in greater detail below, the soot model 54 may use the sensed pressure drop across the particulate filter to estimate the number of grams of soot collected within the particulate filter 24.

When the soot model 54 estimates that the particulate filter 24 requires regeneration (i.e., the amount of estimated soot exceeds a soot threshold), the controller 30 may provide a control signal 56 configured to adjust the operation of the engine 12 and initiate the regeneration, either directly or through an associated engine controller. As mentioned above, in one configuration, the controller 30 may initiate a filter regeneration event by increasing the amount of fuel provided to the engine until the fuel/air ratio is slightly rich of a stoichiometric balance.

The controller 30 may include a computer and/or processor, and include all software, hardware, memory, algorithms, connections, sensors, etc., necessary to monitor and control the exhaust gas after-treatment system 14, engine 12, and/or the differential pressure module 32. As such, a control method operative to evaluate the soot model 54 and/or to initiate a regeneration may be embodied as software or firmware associated with the controller 30. It should be appreciated that the controller 30 may also include any device capable of analyzing data from various sensors, comparing data, making the necessary decisions required to control the exhaust gas after-treatment system 14, as well as monitoring the differential pressure module 32.

Figure 2:
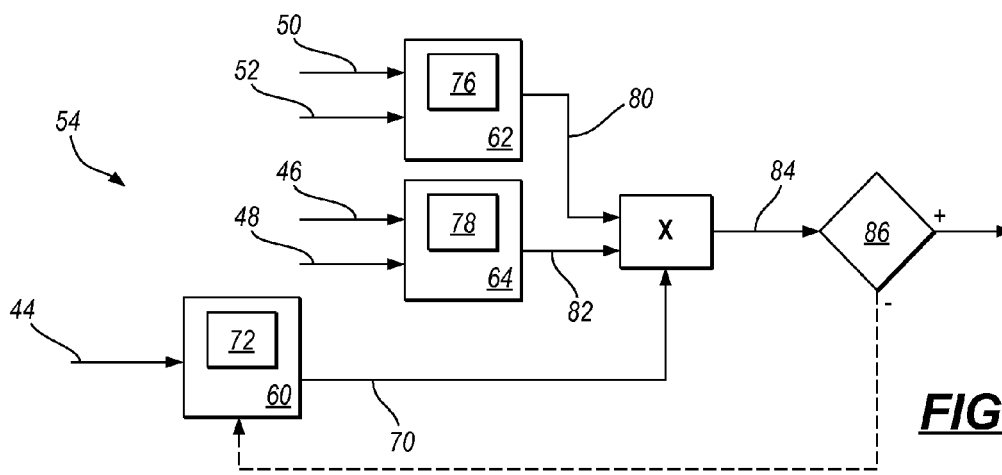
FIG. 2 is a schematic diagram of a soot model including a soot estimator, an engine load correction module, and a NOx correction module.

FIG. 2 schematically represents one configuration of a soot model 54. The soot model 54 may include a soot estimator 60, an engine load correction module 62, and a NOx correction module 64. The soot estimator 60 may receive one or more inputs, including a differential pressure signal 44, from which it may generate an initial output estimate 70 of the collected soot mass within the particulate filter 24 (i.e., the "initial soot mass estimate 70"). In one configuration, the soot estimator 60 may include a look-up table 72 and/or database that may provide the initial soot mass estimate 70 as a function of the monitored differential pressure signal 44. The look-up table 72 may be populated using numeric data obtained either through empirical testing or through analytic formulation. In one configuration, the soot mass estimate 70 may be a value expressed in grams of soot.

Once the initial soot mass estimate 70 is determined, it may be multiplied by both an engine load correction factor 80 and a NOx correction factor 82 to result in a revised soot mass estimate 84. The revised soot mass estimate 84 may then be compared to a threshold at 86 to determine if the particulate filter 24 requires regeneration. If the revised soot mass estimate 84 is less than the threshold (at 86), the system may continue monitoring the differential pressure module 32 and may re-compute the initial soot mass estimate 70 via the soot estimator 60 (the looping shown schematically via a dashed arrow). Together, the engine load correction factor 80 and the NOx correction factor 82 aid in refining the initial soot mass estimate 70 by accounting for varying pressure responses of the filter 24 in view of varying operating conditions of the vehicle 10. For example, using the correction factors 80, 82, the controller 30 may account for any cracking in the soot cake layer (i.e., the build-up of soot across the filter 24), which may be attributable to high exhaust pressure and/or the presence of $NO_2$. As such, the correction factors 80, 82 may correct any inaccurately low initial soot estimates that may be attributable to a lower pressure drop, even despite a likelihood that the filter 24 is filled with soot.

The engine load correction module 62 may include a two-dimensional look-up table 76 that may output an engine load correction factor 80 based on a provided engine speed 50 and a provided engine load 52. The engine load correction factor 80 may be an adjustment factor that may scale the initial soot mass estimate 70 to account for the dynamic speed/load characteristics of the engine. The two-dimensional look-up table 76 may be populated using numeric data obtained either through empirical testing or through analytic formulation.

The NOx correction module 64 may similarly include a two-dimensional look-up table 78 that may output a NOx correction factor 82 based on a provided NOx flowrate 46 and monitored temperature 48. The NOx correction factor 82 may be an adjustment factor that may scale the initial soot mass estimate 70 and/or the engine load correction factor 80 to account for the amount and temperature of the NOx passing through the particulate filter 24. The two-dimensional look-up table 78 may be populated using numeric data obtained either through empirical testing or through analytic formulation. In this manner, any correction applied to the initial soot mass estimate 70 may account for increased $NO_2$ passing through the particulate filter 24, which may otherwise decrease perceived pressure across the filter 24.

In practice, the NOx correction module 64 dynamically adjusts the soot model 54 for the performance of the SCR catalyst 22. Said another way, the engine correction module 62, if used alone, may be unable to correct the soot model 54 to account for SCR performance. Similarly, the NOx correction module 64, if used alone, may be unable to correct the soot model 54 to account for dynamic engine behavior. When taken in combination, by monitoring the NOx flowrate 46, the monitored temperature 48, the engine speed 50, and the engine load 52, the controller 30 may dynamically adjust its maintained initial soot mass estimation 70 to account for both current engine behavior and current SCR performance.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of correcting a soot mass estimate in a vehicle exhaust after-treatment device comprising:
    monitoring an exhaust gas pressure drop across a particulate filter included with the vehicle exhaust after-treatment device;
    determining an initial soot mass estimate from the monitored exhaust gas pressure drop;
    monitoring an engine speed and an engine load from an engine in fluid communication with the vehicle exhaust after-treatment device;
    determining an engine load correction factor from the monitored engine speed and engine load;
    monitoring a temperature of an exhaust gas within the vehicle exhaust after-treatment device;
    monitoring a NOx flow rate of the exhaust gas;
    determining a NOx correction factor from the monitored exhaust gas temperature and monitored NOx flow rate of the exhaust gas;
    calculating a revised soot mass estimate by multiplying the initial soot mass estimate by the engine load correction factor and the NOx correction factor; and
    generating, via a controller, a particulate filter regeneration request if the revised soot mass estimate exceeds a threshold, wherein the particulate filter regeneration request is operative to adjust the operation of a vehicle engine to initiate a regeneration of the particulate filter.

2. The method of claim 1, wherein determining an engine load correction factor includes selecting an engine load correction factor from a look-up table, the look-up table being a two-dimensional look-up table expressing the engine load correction factor as a function of the engine speed and the engine load.

3. The method of claim 1, wherein determining a NOx correction factor includes selecting a NOx correction factor from a look-up table, the look-up table being a two-dimensional look-up table expressing the NOx correction factor as a function of the exhaust gas temperature and the NOx flow rate of the exhaust gas.

4. The method of claim 1, wherein monitoring the exhaust gas pressure drop across a particulate filter includes:
   obtaining a first pressure signal from a first fluid tube disposed in fluid communication with the exhaust after-treatment device and between the particulate filter and an engine;
   obtaining a second pressure signal from a second fluid tube disposed in fluid communication with the exhaust after-treatment device and on an opposite side of the particulate filter from the first fluid tube;
   determining a difference between the first pressure signal and the second pressure signal.

5. A system for monitoring a particulate filter of an exhaust after-treatment device in fluid communication with an engine of a vehicle, the system comprising:
   a first fluid tube disposed in fluid communication with the exhaust after-treatment device and between the particulate filter and the engine;
   a second fluid tube disposed in fluid communication with the exhaust after-treatment device and on an opposite side of the particulate filter from the first fluid tube;
   a differential pressure module in communication with the first fluid tube and the second fluid tube and configured to generate a delta pressure signal corresponding to a pressure drop between the first fluid tube and the second fluid tube; and
   a controller in communication with the differential pressure module and configured to:
      receive the delta pressure signal from the differential pressure module;
      determine an initial soot mass estimate from the delta pressure signal;
      monitor an engine speed and an engine load of the engine;
      determine an engine load correction factor from the monitored engine speed and engine load;
      monitor a temperature of an exhaust gas within the vehicle exhaust after-treatment device;
      monitor a NOx flow rate of the exhaust gas;
      determine a NOx correction factor from the monitored exhaust gas temperature and monitored NOx flow rate of the exhaust gas;
      calculate a revised soot mass estimate by multiplying the initial soot mass estimate by the engine load correction factor and the NOx correction factor; and
      generate a particulate filter regeneration request if the revised soot mass estimate exceeds a threshold, wherein the particulate filter regeneration request is operative to adjust the operation of the vehicle engine to initiate a regeneration of the particulate filter.

6. The system of claim 5, wherein the controller is configured to determine an engine load correction factor by selecting an engine load correction factor from a look-up table, the look-up table being a two-dimensional look-up table expressing the engine load correction factor as a function of the engine speed and the engine load.

7. The system of claim 6, wherein the controller is configured to determine a NOx correction factor by selecting a NOx correction factor from a look-up table, the look-up table being a two-dimensional look-up table expressing the NOx correction factor as a function of the exhaust gas temperature and the NOx flow rate of the exhaust gas.

8. A method of correcting a soot mass estimate in a vehicle exhaust after-treatment device comprising:
   obtaining a first pressure signal from a first fluid tube disposed in fluid communication with the exhaust after-treatment device and between a particulate filter and an engine;
   obtaining a second pressure signal from a second fluid tube disposed in fluid communication with the exhaust after-treatment device and on an opposite side of the particulate filter from the first fluid tube;
   determining an exhaust gas pressure drop across the particulate filter from the first pressure signal and the second pressure signal;
   determining an initial soot mass estimate from a monitored exhaust gas pressure drop;
   monitoring an engine speed and an engine load from an engine in fluid communication with the vehicle exhaust after-treatment device;
   determining an engine load correction factor from the monitored engine speed and engine load;
   monitoring a temperature of an exhaust gas within the vehicle exhaust after-treatment device;
   monitoring a NOx flow rate of the exhaust gas;
   determining a NOx correction factor from the monitored exhaust gas temperature and monitored NOx flow rate of the exhaust gas;
   calculating a revised soot mass estimate by multiplying the initial soot mass estimate by the engine load correction factor and the NOx correction factor; and
   generating, via a controller, a particulate filter regeneration request if the revised soot mass estimate exceeds a threshold, wherein the particulate filter regeneration request is operative to adjust the operation of the engine to initiate a regeneration of the particulate filter.

9. The method of claim 8, wherein determining an engine load correction factor includes selecting an engine load correction factor from a look-up table, the look-up table being a two-dimensional look-up table expressing the engine load correction factor as a function of the engine speed and the engine load.

10. The method of claim 8, wherein determining a NOx correction factor includes selecting a NOx correction factor from a look-up table, the look-up table being a two-dimensional look-up table expressing the NOx correction factor as a function of the exhaust gas temperature and the NOx flow rate of the exhaust gas.

* * * * *